United States Patent
Betti et al.

(10) Patent No.: US 9,106,703 B2
(45) Date of Patent: Aug. 11, 2015

(54) METHOD FOR PROVIDING IP SERVICES TO A USER OF A PUBLIC NETWORK

(75) Inventors: Alessandro Betti, Rome (IT); Laura Maspes, Rome (IT); Fabio Mazzoli, Rome (IT); Patricia Scognamiglio, Rome (IT)

(73) Assignee: Telecom Italia S.p.A., Milan (IT)

( * ) Notice: Subject to any disclaimer, the term of this patent is extended or adjusted under 35 U.S.C. 154(b) by 266 days.

(21) Appl. No.: 13/520,145

(22) PCT Filed: Dec. 30, 2009

(86) PCT No.: PCT/IT2009/000602
§ 371 (c)(1),
(2), (4) Date: Jun. 29, 2012

(87) PCT Pub. No.: WO2011/080783
PCT Pub. Date: Jul. 7, 2011

(65) Prior Publication Data
US 2012/0284775 A1 Nov. 8, 2012

(51) Int. Cl.
*G06F 7/04* (2006.01)
*H04L 29/08* (2006.01)
(52) U.S. Cl.
CPC ............... *H04L 67/16* (2013.01); *H04L 67/14* (2013.01)

(58) Field of Classification Search
None
See application file for complete search history.

(56) References Cited

U.S. PATENT DOCUMENTS

| 2006/0218291 | A1 | 9/2006 | Zhu et al. | |
| 2007/0191014 | A1* | 8/2007 | Zheng et al. | 455/438 |
| 2007/0201441 | A1* | 8/2007 | Buckley | 370/356 |
| 2010/0011401 | A1* | 1/2010 | Peng et al. | 725/116 |

FOREIGN PATENT DOCUMENTS

| EP | 1830536 A1 | 9/2007 |
| WO | 2008/134955 A1 | 11/2008 |

OTHER PUBLICATIONS

International Preliminary Report on Patentability dtd Jul. 4, 2012, PCT/IT2009/000602.
International Search Report dtd Oct. 22, 2010, PCT/IT2009/000602.

* cited by examiner

*Primary Examiner* — Brandon Hoffman
(74) *Attorney, Agent, or Firm* — Banner & Witcoff, Ltd.

(57) ABSTRACT

A method for providing IP services to a user of a public network is disclosed. The user accesses the public network using a user equipment which supports a first set of IP services. The network provides a second set of IP services. A third set of IP services, included in a first set and second set of IP services, is identified and the user is allowed to access a plurality of IP services of a third set. A public network suitable to implement the method is also disclosed.

20 Claims, 5 Drawing Sheets

| Progressive Number | IMSI | MSISDN | IMEI | HSS |
|---|---|---|---|---|
| 501 | 502 | 503 | 504 | 505 |
| | | | | |
| | | | | |
| | | | | |

Fig. 5

METHOD FOR PROVIDING IP SERVICES TO A USER OF A PUBLIC NETWORK

CROSS REFERENCE TO RELATED APPLICATIONS

This is a U.S. National Phase Application under 35 U.S.C. §371 of International Application No. PCT/IT2009/000602, filed Dec. 30, 2009, which was published Under PCT Article 21(2), the entire contents of which are incorporated herein by reference.

TECHNICAL FIELD

The present invention relates to the field of telecommunications, and in particular to methods for providing services via a telecommunication network. More particularly, the invention relates to a method for providing services via a public network according to the preamble of claim 1, e.g., via a mobile network. The invention also relates to a telecommunication network suitable for providing the above methods.

BACKGROUND ART

Telecommunications networks, and in particular mobile networks, are getting more and more complex for providing a large number of services to the network users, i.e. to the people making use of the services provided by the network.

Public Land Mobile Networks (PLMN) are an example of mobile networks wherein the core network comprises "traditional" circuit switched (CS) and packet switched (PS) subsystems for managing voice calls, and an additional subsystem called IP Multimedia Subsystem (IMS) comprising all the elements for delivering IP multimedia services comprising audio, video, text, chat, presence, etc. and a combination of them delivered over the Packed Switched domain. An example of a PLMN network is disclosed in the 3GPP technical specification TS 23.002 v.8.6.0 (2009-10); the IMS subsystem of this network comprises elements disclosed in the 3GPP technical specifications TS 23.002 v.8.6.0 (2009-10) and TS 23.228 v.8.9.0 (2009-06) and its architecture is shown in FIG. 1, wherein elements provided by the standard are indicated with the standard symbols and abbreviations indicated in the annexed table 1.

In order to allow a user to access these services, it is necessary that all the relevant registers of the network are provisioned with all the user's data. As an example, the Home Subscriber Server (HSS), being the master database containing the subscription-related information to support the network entities actually handling calls/sessions, needs to be provisioned with subscriber-related information (e.g. IMS Private User Information and IMS Public User Information) for identification and addressing purposes and with service-related information for enabling or barring services.

Also the Service Locator Function (SLF), comprising the database, containing the information for associating a user to one or more services and to one HSS, and some Application Servers (AS) shall be provisioned with subscriber-related information.

Provisioning of these data in the network registers is a real access barrier for the user since it requires the user to follow complicated procedures to register himself for the services, e.g. sending an SMS (Short Message Service), making a voice call or going to the network operator's shop or web site. Data collected by the network operator are then recorded into the relevant network registers (e.g. HSS and SLF) by a provisioning system.

In order to overcome this drawback, it is known to implement an a-priori provisioning procedure, wherein the provisioning of the users data is done in advance for all users. This solution does not care if the subscription is really used in the network and brings to an unnecessary use of resources in HSS.

An alternative approach is the auto-provisioning. User data are recorded in the relevant registers when a service session is set up for the first time when session control plan recognises a new user not found in relevant registers (e.g. HSS). This solution has the drawback that each time a user starts a new session for a different service, it is necessary to provision the user data to the relevant Application Servers of the IMS, thus requiring time delaying in the provisioning of the services. Furthermore, this solution provides for provisioning the user data once at the first session set-up, therefore if the user changes his/her equipment, for example a mobile equipment (e.g. his/her smart phone) and wants to access to new services, or if the network improves its services portfolio, the user needs to register via traditional systems like SMS.

OBJECTS AND SUMMARY OF THE INVENTION

It is an object of the present invention to overcome the drawbacks of the prior art.

In particular, it is an object of the present invention to simplify the procedures for registration of a user to the network services without requiring effort by the user or a huge amount of organizational processes.

It is another object of the present invention to provide access to new services to a user that changes his/her user equipment with one able to support new or different services with respect to the previous one.

It is another object of the present invention to provide access to new services to a user once they are available from the network and the user equipment is supporting them.

It is a further object of the present invention to provide a secure access to IP services, in particular to IMS services.

According to the invention these and other objects are achieved by a method comprising the features of the annexed claims, which are an integral part of the present description.

The inventors have considered to providing IP services to a user of a public network by identifying a plurality of IP services that can be supported by the user equipment used by the user to access the network, and subsequently allowing the user to access at least a group of these IP services.

This results in an improved auto-provisioning procedure wherein, each time a user requests to access an IP based service, for example an IMS service, the user equipment type is checked and if the user is accessing the IP based service for the first time or if he/she is doing that with a different equipment with respect to previous accesses of the IP based service, than the user data are provisioned to the relevant registers in order to allow the user to access to one or more services selected on the basis of the user equipment in a manner that is transparent to the user (i.e., no action is required by the user).

This solution provides great advantages since it allows a dynamic updating of the IP services that can be provided to the user: each time the user changes the user equipment, the services can be updated.

In a first embodiment, when a user accesses the network for the first time, or when he/she changes his/her user equipment, the user is registered to (i.e. he/she is allowed to use) all the IP services, in particular IMS services, that can be supported by this user equipment. In this way the number of times is reduced when it is necessary to provision the registers associated to the different IP services and/or to the user profile. In a different embodiment, the IP services for which the user is registered are selected based on user profile information suitable for identifying the behaviors of the subscriber in using the services of the network. As an example, this user profile information can be one of the following: time duration of the calls made by the user, frequency of use of IP services, type of subscription contract.

In a preferred embodiment, the selection of the IP services to which registering the user is made using an information relative to the user equipment that is collected when the user accesses the network; such an information can be the IMEI code of the user equipment, a subset of the digits of the IMEI code, for example the initial digits of the IMEI code, an identifier of the software user agent used to start an IP session, an identifier of the software user agent used to start a SIP session in the IP service, an information relative to the model type of the user equipment. Each piece of these particular information provides advantages. The IMEI is a code 1 whose first digits indicate the equipment model, therefore it gives good indications of the functionalities supported by the equipment. The software user agent requesting IP services gives a better indication of the user equipment capabilities, since a user can update the software of his/her user equipment, therefore the IMEI does not change, but the software does.

In a further embodiment, a maximum provisioning time is defined, whereby if a provisioning attempt exceeds said maximum provisioning time, then the network decides to allow the user to access the IP services independently from the provisioning session, and bases the decision of allowing or denying access to IP services only on information stored before starting the provisioning attempt. This is advantageous since provisioning can take some time and the user cannot wait too long.

In a further advantageous embodiment, the method provides for an authentication phase wherein information suitable to identify the user are collected during access to the network and are compared to similar information provided by the user to a server involved in the process for allowing or denying the user to access the IP services. If these two information do not match than the network does not provide the IP service requested.

In a preferred embodiment, the method provides for delivering of IMS services, i.e. IP services delivered via an IP Multimedia subsystem.

The invention also relates to a public network provided by suitable means adapted to implement the preferred and advantageous methods above described.

In particular, in one embodiment the network comprises:
an authentication system suitable to collect information relating to the user equipment when the user accesses the network,
a provisioning system suitable to provision network registers with user related data, said network registers being associated to a plurality of IMS services supported by the user equipment, and
a service locator function server operatively connected to said authentication system and to said provisioning system, the service locator function server storing data relative to users allowed to access IMS services provided by the network and data relating to a user equipment associated to said user.

The service locator function server is adapted to compare the information relating to the user equipment collected by said authentication system with the data relating to user equipment stored by said service locator function server, so as to request said provisioning system to provision said registers if information relating to the user equipment collected by said authentication system was not stored by said service locator function server.

In one embodiment, the service locator function server comprises a timer and is adapted to wait on a provisioning process for a predetermined time, and to allow or deny access to IMS services based on information stored by said service locator function server if said predetermined time expires before the end of the provisioning process.

In one embodiment, the IP multimedia subsystem of the network comprises a call session control function server adapted to receive a request for an IMS service to be provided to the user and adapted to provide first information suitable to identify the user to the service locator function server. The authentication system collects second information suitable to identify the user when the user accesses the network, and provides this information to the service locator function server. The latter compares said first and second information suitable to identify the user in order to reject the requested IMS service if the said first and second information do not match. This embodiment improves security of the network and is therefore preferred.

BRIEF DESCRIPTION OF THE DRAWINGS

The invention will be presented herebelow with reference to non limiting examples, provided for explicative and non limitative reasons in the annexed drawings. These drawings illustrate different aspects and embodiments of the present invention and, where appropriate, reference numerals illustrating like structures, components, materials and/or elements in different figures are indicated by similar reference numbers.

FIG. 5 shows database SLF* according to an embodiment of the present invention.

DETAILED DESCRIPTION OF THE INVENTION

Figure 1:
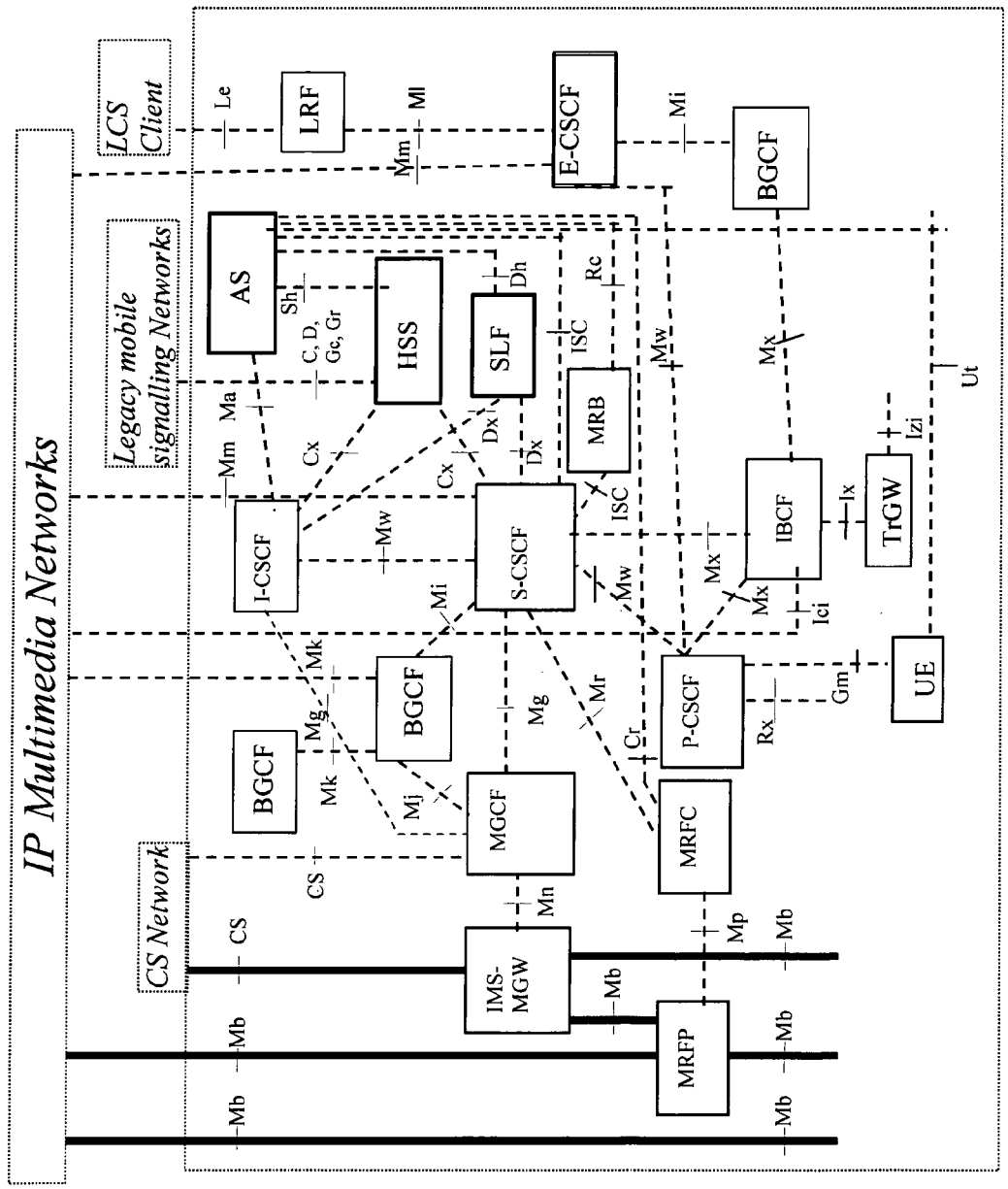
FIG. 1 illustrates an IP multimedia subsystem of a PLMN network according to the prior art.

While the invention is capable of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the scope of the invention as defined in the claims.

In the following description and in the figures, like elements are identified with like reference numerals. The use of "e.g.," "etc," and "or" indicates non-exclusive alternatives without limitation unless otherwise noted. The use of "including" means "including, but not limited to," unless otherwise noted. The noun "register" is used to indicate a readable memory area.

Figure 2:
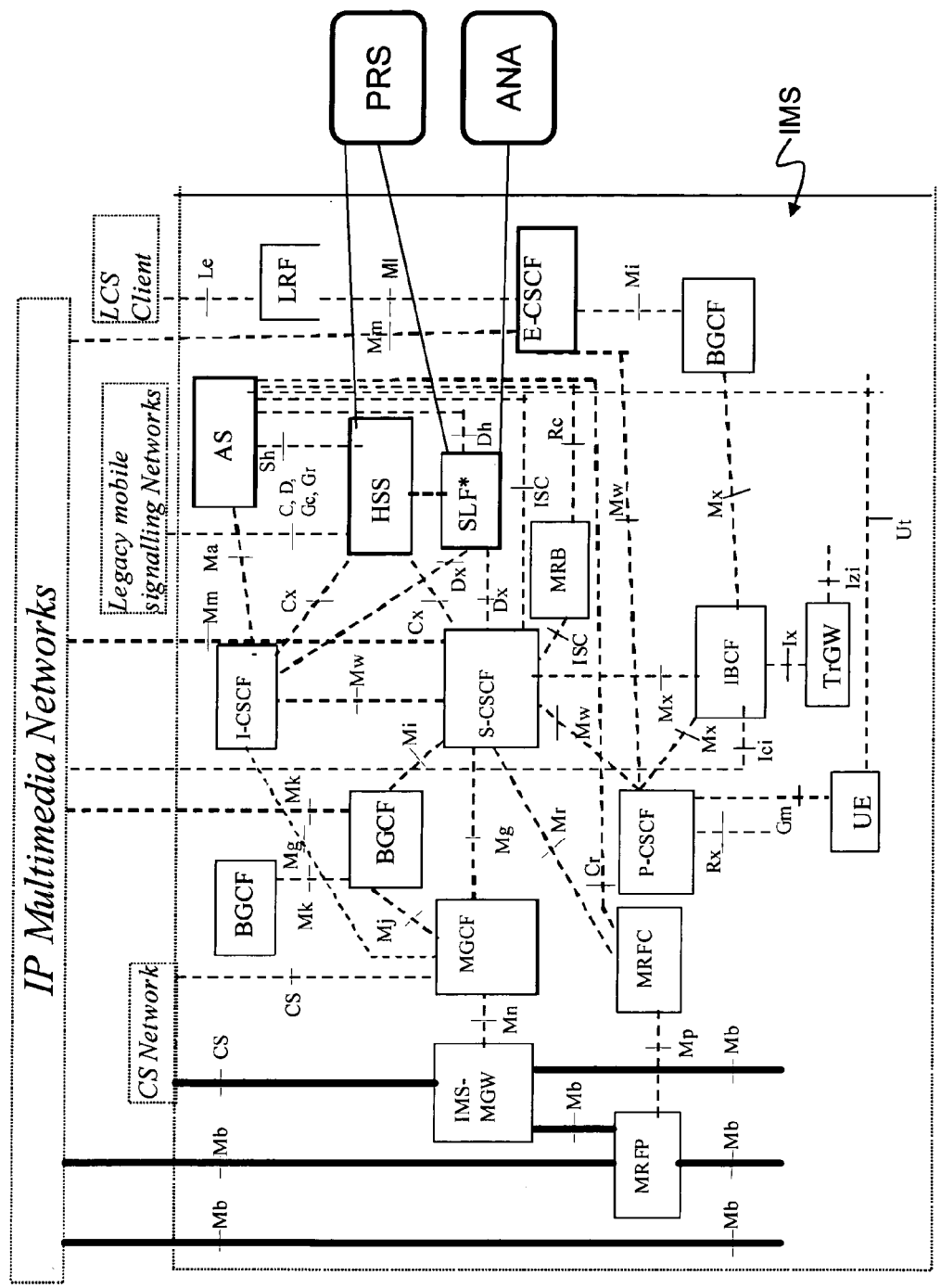
FIG. 2 illustrates an IP multimedia subsystem of a public network according to a first embodiment of the present invention.

In FIG. 2, disclosed is an IP Multimedia subsystem (IMS) of a PLMN network which allows implementing a method for providing IP services to a user of the network, and in particular to a mobile user. FIG. 2 also shows certain elements, blocks, computer, computer servers, systems and network operatively connected to the IMS.

Many of the architectural blocks of FIG. 2 are the same of the IP Multimedia Subsystem provided by the 3GPP technical specifications TS23.002 and TS23.228 shown in FIG. 1; these blocks are per se known and not modified, therefore they will not be described in detail as they are known to a person skilled in the art. Elements provided by the standard are indicated with the standard symbols and abbreviations indicated in the annexed table 1.

Also if not described in detail in the following description, the PLMN network of the present invention comprises an access subsystem and a core network.

The access subsystems comprises all the equipments necessary to establish communication with a user, e.g. Radio Base Stations, NodeB, eNodeB, radio Network Controllers and so on.

The core network is connected to the access subsystem and comprises all the devices for routing flows of information between users of the network or between a user of the network and a user of an external network. The core network comprises the IMS of FIG. 2.

Figure 3:
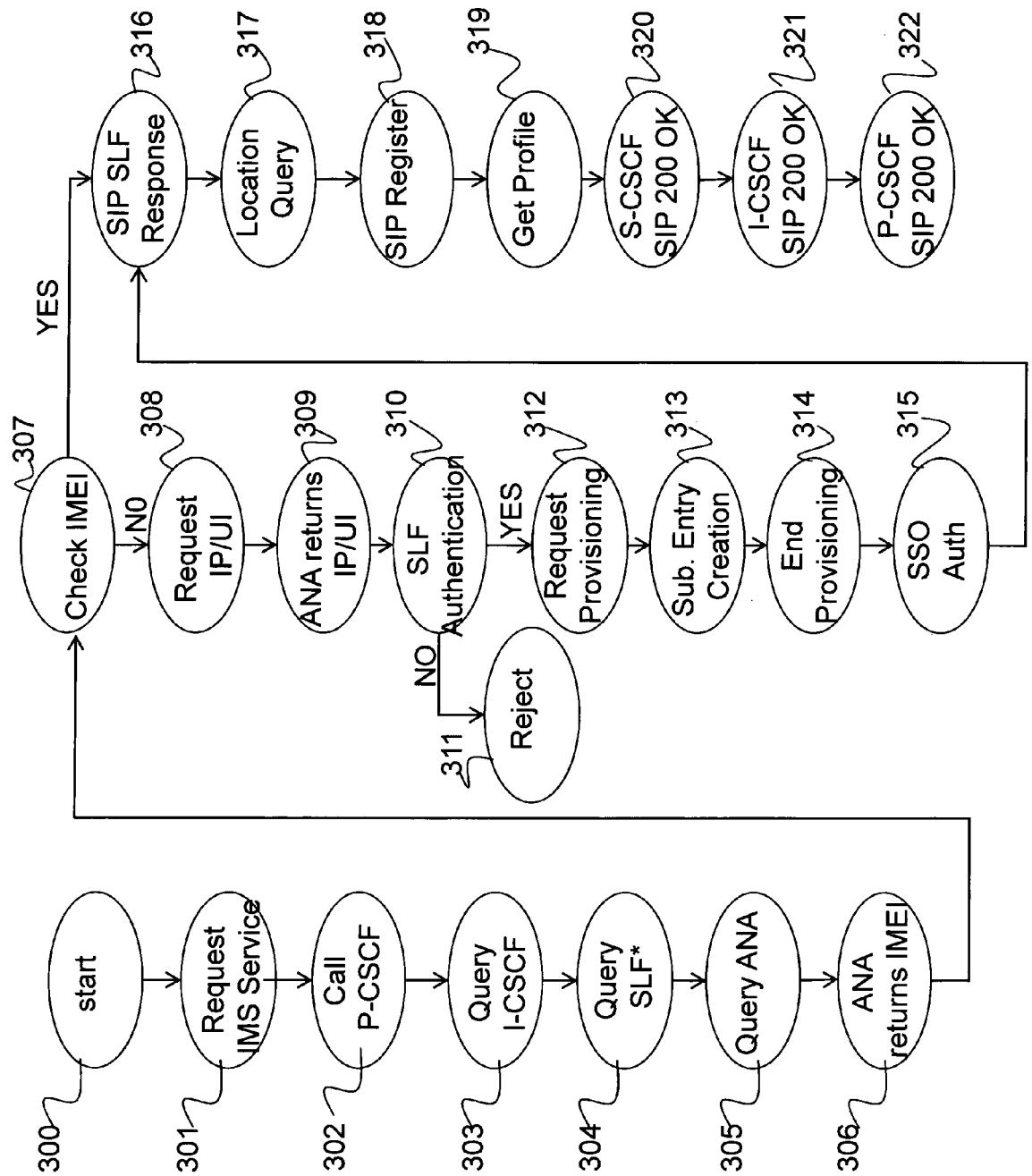
FIG. 3 is a flow diagram illustrating the method according to a first embodiment.
Figure 4:
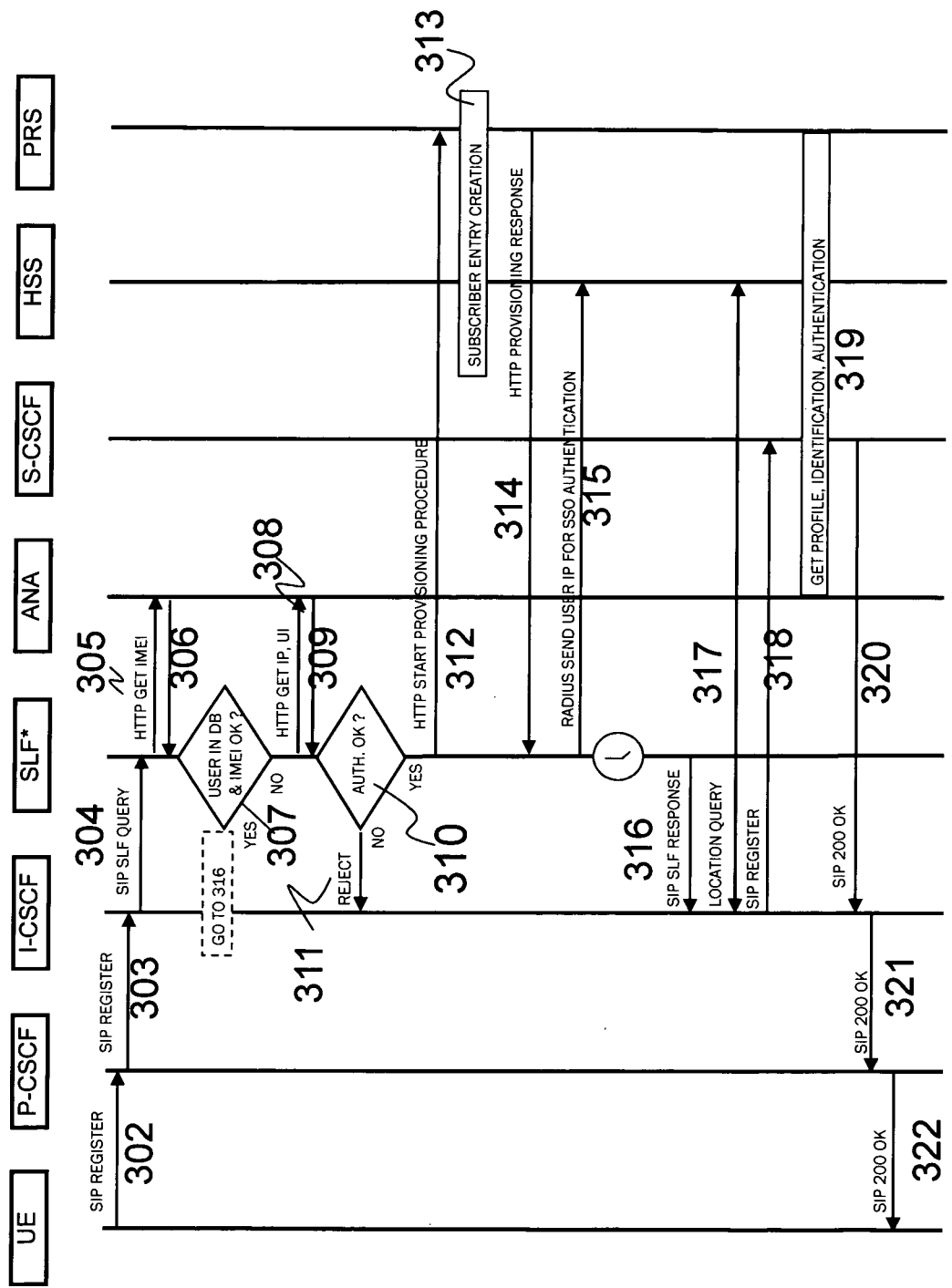
FIG. 4 shows the flow of information within the IMS of FIG. 2.

An embodiment of the method implemented by the PLMN network of the invention is disclosed with reference to FIGS. 3 and 4.

The method starts at step 300, the user access the network with a user equipment (UE). The user equipment can be any device suitable to establish a connection, e.g. a wireless connection with an access equipment (e.g. a Base Station or a NodeB or an E-NodeB) of the network. Therefore, within the meaning of the present description a user equipment can be, e.g., one of a mobile phone, a smart phone, a personal computer, a laptop or a machine provided with a SIM (Subscriber Identification Module) card and relative connection means.

After all the authentication procedures have been completed and the connection between the UE and the network has been established, the user requests (step 301) an IMS service, e.g. a video sharing service. The method also applies in cases wherein the IMS service is not requested by the user, but the network decides to serve the UE using the functionalities of the IMS, e.g. routing a voice call over IP.

A SIP (Session Initiation Protocol) session is therefore started, and the UE starts a registration procedure calling (step 302) a Proxy Call Session Control Function (P-CSCF) that routes the UE to the Serving Call Session Control Function (S-CSCF) which can be in the visited PLMN network or in an external PLMN network (if the user is roaming).

In order to route the user to the S-CSCF, P-CSCF queries (step 303) the I-CSCF (Interrogating Call Session Control Function) to know in which domain the calling user is located.

At step 304 I-CSCF queries the SLF* (Service Locator Function with the feature of the invention) which is a computer server storing a database comprising a plurality of records as shown in FIG. 5. The query may comprise, for example, sending the SLF* a User Identifier (e.g., MSISDN, IMSI) and/or the IP address of the user equipment in the network. In this embodiment, SLF* comprises a plurality of records identified by a progressive number 501. Each record is associated to one user who (for the only purpose of SLF* database) is identified by an IMSI ("International Mobile Subscriber Identity") number 502, an MSISDN ("Mobile Subscriber ISDN") number 503 and an information 504 relative to the user equipment functionalities. In a first embodiment this latter information can be the user equipment model or the user software agent (i.e. the software that is used for performing the SIP registration request). In a preferred embodiment field 504 stores the IMEI (International Mobile Equipment Identity) code which may uniquely identify the user equipment.

In a different embodiment, the user is identified in SLF* database only by the IMEI. In a further different embodiment the user is identified in SLF* database by the IMEI and the MSISDN.

In the embodiment of FIG. 5, for each user the SLF* database comprises an HSS (Home Subscriber Server) field 505 containing an information relating to the HSS wherein the user is registered. As an example, field 505 contains the IP address of the HSS associated to the user identified by the other fields 502, 503 and 504 of the SLF* database.

In its turn, SLF* queries (step 305) the ANA (Access Network Authentication) system to get IMEI of the UE. Within the aims of the present description, the ANA system is a computer server or a group of computer servers that stores information collected in the phase of access to the network. In particular, the ANA stores data transmitted by the UE during authentication of the same (in particular during the AAA procedure and during the IMSI attach procedure). As an example, the ANA stores the IMEI and/or the IMSI and/or the MSISDN and/or the IP address that is assigned to the UE by the network.

SLF* provides to the ANA system the information relating to the user to be located that was received from I-CSCF, and the ANA returns (step 306) information suitable to identify the services that can be supported by the UE. Preferably, the ANA returns information relating to the model of user equipment (e.g. Nokia® 9xxx) so that this information can be used to select the IMS services that can be supported by the UE. In a more preferred embodiment, which is considered in the following description, the ANA returns the IMEI of the UE used by the subscriber when authenticating in the network. In any case, the ANA shall return information that can be compared with the information in field 504 of SLF* database. For example, if the ANA returns an IMEI, field 504 can contain the entire IMEI or a subset of the digits of the IMEI (for example only the first 6 or 8 digits of the IMEI).

SLF* checks (307) if the user is already present in the database and if the IMEI received from the ANA is the same stored in field 504.

If the user is already registered in the SLF* database and if the IMEI received from the ANA is the same stored in the database, then the method goes to step 316 (explained in detail below) wherein procedures for providing the requested service to the user are carried out.

If the user is not registered in the SLF* database or if the IMEI received from the ANA is not the same as the information stored in the database, then this means either that the user is a new user, or that the user has changed his/her user equipment.

In both cases, the method according to the invention provides for an updating of the relevant network registers in order to allow IMS services to be delivered to the user.

Before updating the registers, the method of FIGS. 3 and 4 provides for an authentication phase wherein the SLF* requests the ANA (step 308) to provide the original IP address and/or the User Identifier (UI) (e.g. MSISDN, IMSI) that were assigned to the UE during the network connection phase.

Once the ANA returns the requested information (step 309), SLF* checks (310) if the UI and the original IP address are the same as that provided by I-CSCF to SLF* at step 304.

If one of the UI and/or the IP address provided by the ANA does not correspond to the one provided by I-CSCF, then the SLF* rejects (step 311) the SIP request and the method ends with the network not providing services to the user.

If both the UI and the IP address provided by the ANA correspond to the ones provided by I-CSCF, then the SLF* starts a provisioning procedure requesting the provisioning system (PRS) (step 312) to update all the necessary registers as illustrated in more detail below. The request provides the PRS with information such as the IMSI, MSISDN, and user profile type (default or specific) to create a new subscription entry in relevant IMS database.

The authentication phase is not essential for the present invention, from step 307 it is possible to go immediately to step 312 if the IMEI received from the ANA is different from the one registered for the user or if the user is not registered at all in the SLF* database. Nevertheless this authentication step allows avoiding that a user connects to the network with his/her own SIM card and then changes his/her IP address or his/her identifier in order to access IMS services using the identity of another subscriber.

In reply to the request from the SLF*, the provisioning system (PRS) creates (step 313) a new user profile for the user by registering the relevant user data in the relevant network register. As an example, the PRS updates:

- the HSS so that the user is allowed to access certain IMS services,
- the SLF* in order to create a new record for a user allowed to IMS services, or to update the IMEI number of the user equipment,
- Application Servers (AS) that runs applications necessaries for the IMS services supported by the user equipment.

In one embodiment, the SLF* transmits the IMEI of the UE to the PRS, so that the PRS registers the user for all the IMS services that can be supported by the user equipment. To this purpose, the PRS is provided with a database wherein IMS services are associated with different models of user equipments. According to the 3GPP standards in use, the user equipment model can be identified from the first 6-8 digits of the IMEI. Therefore the PRS, having received the IMEI from the SLF*, may use the IMEI to identify which services are supported by the user equipment.

In another embodiment, the PRS registers the user for a selection of IMS services that can be supported by the user equipment. In this embodiment, the PRS receives both the IMEI and information for identifying the user subscription (in particular the MSISDN number or the UI) from the SLF*. By using information identifying the user, the PRS may retrieve user profile information stored in a user profile database. This database can be stored in the PRS or in a computer server of the network (e.g. HSS) which can be accessed by the PRS, and stores information (the "user profile information") suitable for identifying the attitudes of the subscriber, e.g. time duration of the calls made by the user, or time duration or volume of data session made by the user, frequency of use or typology of IMS services, type of subscription contract and so on.

The PRS identifies the services that can be supported by the UE using the IMEI, then uses the user profile information PRS selects a group of IMS services that can be of interest for the user based on the user profile information. After that the PRS starts the provisioning procedure by provisioning the relevant registers of the network with the user data.

Once the provisioning procedure 313 is ended, the PRS replies (step 314) to the SLF* to indicate that the provisioning procedure is ended and the user is now registered for the requested service and for other IMS services supported by his/her UE.

Communication between the SLF* and the PRS can be made through any existing communication protocol. In one embodiment they communicate via HTTP.

The SLF* may implement a time-out waiting period for a response from the provisioning system before starting SSO (Single Sign On) authentication procedure (send user IP to HSS) and to provide a SLF response to the CSCF.

Provisioning of the relevant network registers can take long time, therefore the SLF* is provided with a timer and, after a predetermined time, replies to the SIP SLF query (step 304) from I-CSCF without waiting for end of the provisioning. Therefore, if at the time of the SIP SLF request the SLF* had the user in its database and if the predetermined time-out time is expired, then the SLF* replies to the I-CSCF with a positive SIP SLF response independently from the fact that the UE has changed. If, on the other hand, the user was not in the SLF* database, the SLF* replies to I-CSCF with a negative SIP SLF response without waiting for creation of the user profile in the HSS and provisioning of all the other necessary databases as indicated above.

Supposing the PRS ends provisioning before the time-out expires, at step 315 of the method, the SLF* sends a current user IP address to HSS for SSO authentication and checks if the time-out period expires.

Then the SLF* resumes 3GGP IMS standard procedure for user registration by providing I-CSCF with SIP SLF response (step 316).

Having received the HSS location from the SLF*, I-CSCF contacts (step 317) HSS for location query and forwards the UE register to S-CSCF (steps 318).

S-CSCF gets user profile information, assesses user identification/authentication (step 319), and responds SIP 200 OK to the UE via I-CSCF and P-CSCF (steps 320-322).

At this moment the SIP session starts and the IMS service is provided to the user.

From the above described preferred embodiments, the advantages of the present invention are clear. The improved SLF* functionality allows immediate access to the IMS service set associated with the capabilities of the user equipment, even if the user is not yet provisioned in the relevant IMS database, after having securely identified the user (e.g. checking IMSI and/or MSISDN and/or IP received in a SIP message and comparing with network access user identifiers) and after creating or updating a subscription entry transparently to the user.

It is also clear that the person skilled in the art can provide many changes to the embodiments above described without departing from the scope of the present invention as it results from the annexed claims.

In particular the servers implementing the SLF*, the P-CSCF, I-CSCF, S-CSCF, PRS and ANA can be made of one or more computer devices in various way connected, integrated or in communication.

In one embodiment, if the PRS detects that the user is using a new user equipment which allows only a reduced or different number of IMS services with respect to the previous UE whose identifier is stored in the SLF*, then the PRS registers the user for the new additional services without removing registration for the previous registered IMS services. In one embodiment, the PRS is informed of both the previous user equipment and of the new user equipment since it receives information regarding both from the SLF* during the request of provisioning made at step 312 of the method. In another embodiment, the PRS stores information relating to the user and their UE (e.g. stores the MSISDN and the IMEI) so that when it receives a provisioning request from SLF* (step 312), the PRS compares the received IMEI with the stored one so as to understand for which IMS services provisioning is required.

Notwithstanding the invention has been described with reference to a preferred embodiment of a PLMN network providing IMS services, the invention is not limited to such a type of network and to these particular IP services. A person skilled in the art, in fact, can apply the teachings above described to any type of public network delivering IP services to its users. In any public network (e.g. a public mobile network, a public mixed mobile and fixed network) it is possible to implement a method for providing IP services to a user of a public network, wherein the user accesses the public network using a user equipment,
the user equipment supports a first set of IP services,
the network provides a second set of IP services, and wherein the following steps are carried out:
identifying a third set of IP services comprised in said first and second set of IP services,
allowing said user to access a plurality of IP services of said third set.

As an example, the network can be a public mobile network provided with an access subsystem wherein the user can access the network via a wi-fi connection to an access point connected via an IP connection (e.g. via the Internet) to a remote network controller suitably connected to the core network. An example of network of this type, is a UMA (Unlicensed Mobile Access) network which provides Circuit, Packet and IMS-based services via an improved access subsystem which, in addition to radio base stations, nodeB or e-nodeB, comprises access points and femtocells which communicates in a wireless way (e.g. wi-fi or GSM/UMTS) to the user equipment, and via IP to the UNC (UMA Network Controller) that is connected or integrated in the core network.

In a further embodiment, the method can be applied to a public network wherein the user accesses the network via a fixed connection, e.g. by connecting his/her user equipment to a fixed access equipment (like a modem or a gateway) by a cable; the fixed access equipment being connected via IP to the core network or to a suitable device that receives/transmits IP data from/to the user equipment and is connected to the core network via standard interfaces provided for public networks.

TABLE 1

| | Symbols |
|---|---|
| Cr | Reference Point between an AS and an MRFC. |
| Cx | Reference Point between a CSCF and an HSS. |
| Dx | Reference Point between an I-CSCF and an SLF. |
| Gi | Reference point between GPRS and an external packet data network. |
| Gm | Reference Point between a UE and a P-CSCF. |
| ISC | Reference Point between a CSCF and an Application Server and between a CSCF and an MRB. |
| Iu | Interface between the RNS and the core network. It is also considered as a reference point. |
| Ix | Reference Point between IBCF and TrGW. |
| Ici | Reference Point between an IBCF and another IBCF belonging to a different IM CN subsystem network. |
| Izi | Reference Point between a TrGW and another TrGW belonging to a different IM CN subsystem network. |
| Le | Reference Point between an AS and a GMLC. |
| Ma | Reference Point between an AS and an I-CSCF. |
| Mb | Reference Point to IP network services. |
| Mg | Reference Point between an MGCF and a CSCF. |
| Mi | Reference Point between a CSCF and a BGCF. |

TABLE 1-continued

| | Symbols |
|---|---|
| Mj | Reference Point between a BGCF and an MGCF. |
| Mk | Reference Point between a BGCF/IMS ALG and another BGCF. |
| Mm | Reference Point between a CSCF/BGCF/IMS ALG and an IP multimedia network. |
| Mr | Reference Point between an CSCF and an MRFC. |
| Mw | Reference Point between a CSCF and another CSCF. |
| Mx | Reference Point between a CSCF/BGCF and IBCF. |
| Rc | Reference Point between an AS and an MRB. |
| Sh | Reference Point between an AS (SIP-AS or OSA-CSCF) and an HSS. |
| Si | Reference Point between an IM-SSF and an HSS. |
| Ut | Reference Point between UE and an Application Server. |

ABBREVIATIONS

AS Application Server
BGCF Breakout Gateway Control Function
CN Core Network
CS Circuit Switched
CSCF Call Session Control Function
DHCPDynamic Host Configuration Protocol
E-CSCF Emergency-CSCF
HSS Home Subscriber Server
IBCF Interconnection Border Control Function
I-CSCF Interrogating-CSCF
IM IP Multimedia
IMS IP Multimedia Core Network Subsystem
IMSI International Mobile Subscriber Identifier
IP Internet Protocol
LRF Location Retrieval Function
MGCF Media Gateway Control Function
MGF Media Gateway Function
MRB Media Resource Broker
MRFC Multimedia Resource Function Controller
MRFP Multimedia Resource Function Processor
OSA Open Services Architecture
P-CSCF Proxy-CSCF
PLMN Public Land Mobile Network
S-CSCF Serving-CSCF
SLF Subscription Locator Function
SIM Subscriber Identity Module
SIP Session Initiation Protocol
TrGW Transition Gateway
UE User Equipment
UMTS Universal Mobile Telecommunications System

The invention claimed is:
1. A method of providing IP services to a user of a public network, wherein the user accesses the public network using user equipment, the method comprising:
receiving an access request from the user equipment;
determining whether first device information included in the access request is associated with the user in a database stored on the public network;
in response to determining that the first device information is not associated with the user in the database:
updating the database to associate the first device information with the user;
identifying a common set of IP services included in both a first set of IP services supported by the user equipment and a second set of IP services provided by the public network; and
provisioning one or more network registers with user related data associated with the user, wherein the one or more network registers are associated with the common set of IP services; and
allowing the user to access a plurality of IP services of the common set of IP services on the user equipment based on the user related data stored in the one or more network registers.

2. The method of claim 1, wherein the allowing step includes selecting the plurality of services made available to the user from the common set of IP services based on user profile information.

3. The method of claim 2, wherein the user profile information is selected from among a group of information comprising: time duration of calls made by the user, time duration or volume of a data session of the user, frequency of use or typology of specific IP services by the user, and type of subscription contract.

4. The method of claim 1 wherein the first device information is selected from among a group comprising: an IMEI code of the user equipment, a subset of digits of the IMEI code, an identifier of a software user agent used to start an IP session, an identifier of a software user agent used to start a SIP session, and a model type of user equipment.

5. The method of claim 1, further comprising the steps of:
determining whether execution of the provisioning step exceeds a maximum provisioning time; and
controlling access to IP services based on information available to the network before receiving the access request if the execution of the provisioning step exceeds the maximum provisioning time.

6. The method of claim 1, wherein the first device information identifies a model type of the user equipment and the identification of the common set of IP services is based on the model type of the user equipment.

7. The method of claim 1, further comprising the steps of:
providing first information suitable to identify the user in order to start an IP session;
retrieving second information suitable to identify the user, the second information being collected when the user has accessed the network;
comparing the first information and the second information; and
denying delivery of one or more of the plurality of IP services of the common set of IP services to the user if the first information and the second information do not match.

8. The method of claim 1, wherein the common set of IP services includes a plurality of IP services selected from a group comprising: audio services, video services, text services, chat services, presence services, or any combination thereof.

9. The method of claim 1, wherein the database comprises second device information associated with the user at the time of the access request, and wherein updating the database with the first device information comprises replacing the second device information with the first device information.

10. The method of claim 1, wherein determining that the first device information is not associated with the user in the database comprises determining that the database does not include a user record associated with the user, and wherein updating the database with the first device information comprises generating a new user record associating the user data with the first device information.

11. A public network comprising:
an authentication system configured to receive device information associated with first user equipment when a first user accesses the public network;
a service locator function server configured to:
store data associated with a plurality of users and respective user equipment allowed to access a set of IP services provided by the public network in a database;
determine whether the received device information is included in the database in association with the first user; and
initiate a provisioning operation in response to determining that the device information is not included in the database in association with the first user; and
a provisioning server operatively connected to the service locator function server and the authentication system, the provisioning server configured to:
receive the device information when the database does not include the device information in association with the first user;
identify a first plurality of IP services supported by the first user equipment and available on the public network, wherein the first plurality of IP services are identified based on the device information; and
provision network registers to allow the first user of the first user equipment to access the first plurality of IP services.

12. The public network of claim 11, wherein the first plurality of IP services are selected based on user profile information, wherein the user profile information includes at least one of: time duration of calls made by the first user, time duration or volume of a data session of the first user, and frequency of use of specific IP services by the first user.

13. The public network of claim 11, wherein the service locator function server comprises a timer and is further configured to:
determine whether the provisioning of the network registers by the provisioning server exceeds a maximum provisioning time; and
control access to IP services based on information stored by the service locator function server prior to completion of the provisioning if the provisioning exceeds the maximum provisioning time.

14. The public network of claim 11, wherein the provisioning server is adapted to identify the first plurality of IP services based on at least a part of an IMEI of the first user equipment.

15. The public network of claim 11, wherein the provisioning server identifies the first plurality of IP services based on a software user agent provided on the first user equipment for accessing specific IP services.

16. The public network of claim 11, wherein a call session control function server is adapted to receive a request for IP services to be provided to the first user and is adapted to provide first information suitable to identify the first user to the service locator function server, wherein the authentication system is suitable to collect second information suitable to identify the first user when the first user accesses the network, and wherein the service locator function server is configured to compare the first information and the second information and to deny delivery of IP services if the first information and the second information do not match.

17. A method for providing IP services in a network, the method comprising:
receiving an access request from user equipment associated with a user, wherein the access request includes first device information provided by the user equipment;
determining a first set of IP services supported by the user equipment and available on the network, wherein determining the first set of IP services is based on the first device information;

selecting a second set of IP services based on user profile information associated with the user, wherein the second set of IP services are selected from the first set of IP services; and provisioning one or more network registers with user related data, wherein the network registers are associated with the second set of IP services and are stored in the network; and allowing the user to access the second set of IP services on the user equipment based on the user related data in the one or more network registers.

18. The method of claim 17, wherein the first device information identifies a model type or a software user agent of the user equipment and wherein the first set of IP services is determined based on the model type or software user agent of the user equipment.

19. The method of claim 17, wherein the network comprises an IP Multimedia Subsystem (IMS) for providing IMS services and wherein the second set of IP services comprises at least one IMS service.

20. The method of claim 17, wherein the second set of IP services comprises a voice call service.

\* \* \* \* \*